United States Patent
Hiraguchi

(10) Patent No.: US 6,848,643 B2
(45) Date of Patent: Feb. 1, 2005

(54) CARTRIDGE

(75) Inventor: Kazuo Hiraguchi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/615,921

(22) Filed: Jul. 10, 2003

(65) Prior Publication Data

US 2004/0007639 A1 Jan. 15, 2004

(30) Foreign Application Priority Data

Jul. 10, 2002 (JP) ........................................ 2002-200892

(51) Int. Cl.⁷ ............................................. G11B 23/107
(52) U.S. Cl. ..................................... 242/348; 360/132
(58) Field of Search ............................ 242/347, 347.2, 242/348, 348.2, 348.3, 348.4, 338, 341; 360/132

(56) References Cited

U.S. PATENT DOCUMENTS

| | | | | |
|---|---|---|---|---|
| 5,541,796 A | * | 7/1996 | Sawada | ....................... 360/132 |
| 5,730,382 A | * | 3/1998 | Kaneda et al. | ............... 360/132 |
| 6,299,088 B1 | | 10/2001 | Rambosek | |
| 6,304,416 B1 | * | 10/2001 | McAllister et al. | .......... 360/132 |
| 6,452,745 B1 | * | 9/2002 | Shiga et al. | ................. 360/132 |
| 6,481,658 B1 | * | 11/2002 | Shiga et al. | ................. 360/132 |
| 6,577,471 B1 | * | 6/2003 | Morita et al. | ................ 360/132 |

* cited by examiner

Primary Examiner—William A. Rivera
(74) Attorney, Agent, or Firm—Sughrue Mion, PLLC

(57) ABSTRACT

A recording tape cartridge is provided with a substantially rectangular case, which includes an upper case and a lower case rotatably housing a single reel wound with a recording tape T, and a non-contact memory M, in which is stored various information such as recording capacity and which is disposed at a predetermined angle of inclination inside the case. A pair of screw bosses is formed near both corner portions at a rear side in a direction in which the case is loaded into a drive device, and screws for joining the upper case and the lower case are passed through the screw bosses. The memory M is disposed so that at least part of the memory M is positioned on a virtual straight line T joining the respective screw bosses when seen in plan view. Positional precision of the memory inside the case is improved.

18 Claims, 6 Drawing Sheets

CARTRIDGE

CROSS-REFERENCE TO RELATED APPLICATION

This application claims priority under 35 USC 119 from Japanese patent Application No. 2002-200892, the disclosure of which is incorporated by reference herein.

BACKGROUND OF THE INVENTION

1. Field of the Invention

The present invention relates to a recording tape cartridge including a case within which is housed a single reel wound with a recording tape, such as a magnetic tape, mainly used as a recording and playback medium for computers and the like.

2. Description of the Related Art

Magnetic tape cartridges including a case within which is housed a single reel wound with a magnetic tape used as a recording and playback medium for computers and the like have conventionally been known. A leader member, such as a leader pin, a leader tape, or a leader block, is disposed at a leading end of the magnetic tape. A pull-out mechanism disposed at a drive device pulls out the leader member through an opening in the magnetic tape cartridge and winds the magnetic tape fixed to the leader member around a take-up reel of the drive device.

A reel gear is annularly disposed in a center of a bottom surface of the reel, which is exposed through an open hole that penetrates a bottom surface of the magnetic tape cartridge. A drive gear disposed at a rotating shaft of the drive device meshes with the reel gear, whereby the reel is rotatingly driven. Data can be recorded on the magnetic tape, and data recorded on the magnetic tape can be played back, by synchronously rotating the reel of the magnetic tape cartridge and the take-up reel of the drive device.

Such magnetic tape cartridges are ordinarily plurally housed and stored in a storage called a library device. Rear end sides of both side walls of a desired recording tape cartridge are gripped by a gripping mechanism disposed with a robotic hand and removed from respective storage portions of the library device. The recording tape cartridge is then loaded into one of plural drive devices, whereby data is recorded in the magnetic tape cartridge or data recorded in the magnetic tape cartridge is played back.

A card-type memory board, in which is stored various information such as the recording capacity and the recording format of the magnetic tape cartridge, is internally disposed in a rear wall side of each magnetic tape cartridge so that the magnetic tape cartridge removed from the library device is smoothly loaded into one drive device. It is possible to access (read and write) the memory board with electromagnetic waves in a non-contact mode. The various information stored in the memory board is non-contactingly read by a reading device disposed at the robotic hand and a reading/writing device disposed at the drive device. In this manner, a drive device capable of recording data in the magnetic tape cartridge or capable of playing back data recorded in the magnetic tape cartridge is identified in advance by a control device or the like of the library device, whereby there is no loss in the operation of the gripping mechanism such as the robotic hand.

A conventional magnetic tape cartridge 70 is shown in FIG. 6. The magnetic tape cartridge 70 includes an upper case and a lower case that are joined by screws being screwed therein from an underside. As is shown, screw bosses 80, 82, 84 and 86 are disposed for that purpose. A memory board M is disposed, at an inner side of a rear wall 72 (the direction of arrow P is the front wall) of the recording tape cartridge 70, with an orientation such that it slants at a predetermined angle in a vicinity of the screw boss 80. In other words, the memory board M is disposed at an elevation angle of 45° when seen in side view, so that the memory board M can be accessed from both (two directions) of a rear surface (rear wall 72) and an undersurface 74. Additionally, the memory board M is disposed in the vicinity of a joint portion, i.e., the screw boss 80, whose relatively high strength is secured, so that the position of the memory board M is not shifted even if the memory board M sustains impact resulting from the magnetic tape cartridge 70 being dropped or the like.

Therefore, a reading device 78 disposed at a robotic hand can appropriately access (transmit electromagnetic waves to and receive electromagnetic waves from) the memory board M from the rear surface (rear wall 72) of the magnetic tape cartridge 70, and a reading/writing device 76 disposed at a drive device can appropriately access (transmit electromagnetic waves to and receive electromagnetic waves from) the memory board M from the undersurface 74 side of the magnetic tape cartridge 70. It should be noted that the reading/writing device 76 is a device that not only reads information from the memory board M but also writes information thereto.

It is preferable to dispose the memory board M in this manner in the vicinity of the screw boss 80, which vicinity is a joint area between the upper case and the lower case, because positional shifting of the memory board M is deterred even if the memory board M sustains impact resulting from the magnetic tape cartridge 70 being dropped or the like. However, in order to ensure reliable access by the reading device 78 and the reading/writing device 76 with respect to the memory board M, it is necessary to precisely maintain the distance (a distance for transmitting and receiving electromagnetic waves) from the reading device 78 and the reading/writing device 76 to the memory board M. For this purpose, the memory board M must be precisely positioned in the case.

SUMMARY OF THE INVENTION

According to the invention, a recording tape cartridge that can improve the positional precision of a memory (memory board) in a case is obtained.

One aspect of the invention is a cartridge which is loaded into a drive device and used for recording information on or reading information from a recording medium housed therein, the cartridge comprising: a case that includes an upper case and a lower case, with the upper case and the lower case being joined to house the recording medium inside the case, the upper case and the lower case respectively including, at different positions thereinside, at least two joint surfaces that are put together and fixed in order to join the upper case and the lower case; and a memory that is disposed inside the case and allows predetermined information to be stored in or read from the memory from the outside in a non-contact mode, wherein the memory is positioned so that at least part of the memory overlaps a virtual straight line joining the at least two joint surfaces.

Another aspect of the invention is a recording tape cartridge, which is loaded into a drive device from a predetermined direction for use, the recording tape cartridge comprising: a case including an upper case and a lower case that are mutually joined, the case having a substantially rectangular shape and being for rotatably housing therein a single reel wound with a recording tape; bosses provided inside the case in order to join the upper case and the lower case, the bosses being respectively positioned near both reward corner portions in the predetermined direction; and a non-contact memory in which predetermined information can be stored and that is disposed inside the case, wherein the memory is positioned so that at least part of the memory overlaps, in plan view, a virtual straight line joining the bosses respectively positioned near both corner portions.

Still another aspect of the invention is a cartridge which is loaded into a drive device and used for recording information on or reading information from a recording medium housed therein, the cartridge comprising: a case that includes an upper case and a lower case, with the upper case and the lower case being joined to house the recording medium inside the case, the upper case and the lower case each including, at different positions thereinside, at least two joint portions, the joint portions of the upper case and the joint portions of the lower case being mutually fixed to fix the upper case and the lower case; and a memory that is disposed inside the case and allows predetermined information to be stored in or read from the memory in a non-contact mode, wherein the memory is positioned so that at least part of the memory overlaps a virtual straight line joining the at least two joint portions.

By disposing the memory so that at least part of the memory is positioned on or overlaps the virtual straight line connecting the screw bosses in this manner, the position of the memory disposed inside the case can be more clearly grasped from an outer side. In other words, because the position of the memory disposed inside the case is restricted, the precision of the distance between the memory and a reading device and a writing device that access the memory can be improved, and reading precision and writing precision can be improved.

DETAILED DESCRIPTION OF THE INVENTION

In a first embodiment of the invention, a recording medium housed in a cartridge includes a recording tape, is disposed with a reel, and is wound therearound.

The cartridge is disposed with a case comprising an upper case and a lower case. The upper case and the lower case respectively include, at different positions therein, at least two joint surfaces that are brought into contact with each other and fixed in order to join the upper case and the lower case. Through holes are formed in the joint surfaces of at least one of the upper case and the lower case. At least two fixing members, which are inserted into the through holes and are for fixing the joint surfaces of the upper case and the lower case, are disposed. The fixing members are disposed with screws including threaded portions. The upper case and the lower case respectively include at least two bosses or boss portions, and the joint surfaces are formed at the bosses (boss portions).

The cartridge is substantially rectangular, and the at least two joint surfaces are positioned in the vicinities of both corner portions of a rearward side in a loading direction.

Also, the cartridge includes a reference surface, and when the cartridge is loaded in a drive device from a predetermined loading direction and placed therein, at least the surface thereof is placed, whereby a reference position is provided. The memory is positioned near a virtual straight line that passes through (or along) the reference surface and is parallel to the predetermined loading direction.

The memory is disposed in the case at a predetermined angle of inclination with respect to the loading direction. Predetermined information includes information regarding recording capacity.

A recording tape cartridge 10 pertaining to an embodiment of the invention will be described below on the basis of FIGS. 1 through 4. First, the overall configuration of the recording tape cartridge 10 will be described briefly, and then the main parts pertaining to the invention will be described in detail. For convenience of explanation, the direction in which the recording tape cartridge 10 is loaded into a drive device will be represented by arrow A and referred to as the front direction (front side) of the recording tape cartridge 10. The direction of arrow B, which is orthogonal to the direction of arrow A, will be referred to as the right direction.

Figure 1:
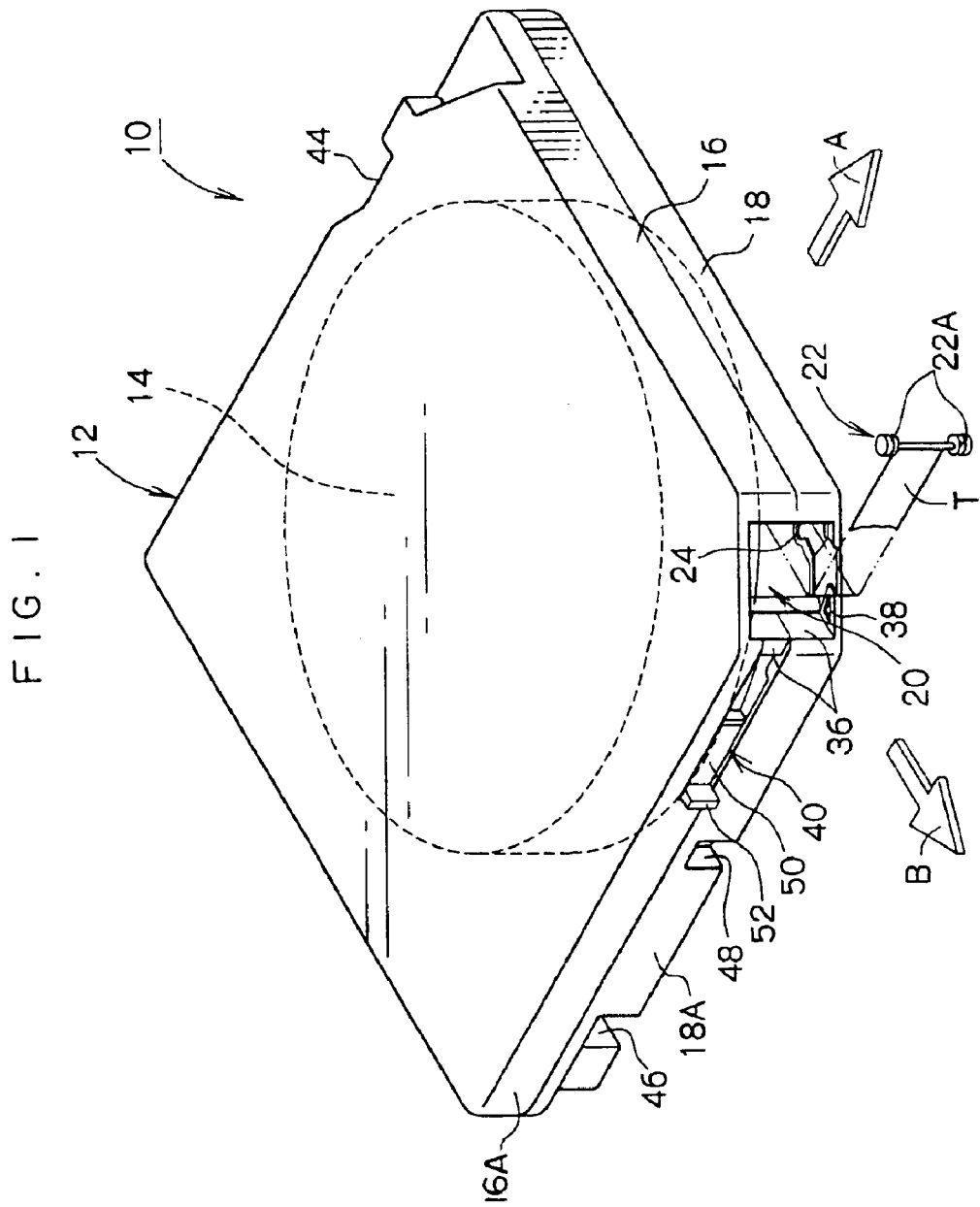
FIG. 1 is a schematic perspective view of a recording tape cartridge of the invention.
Figure 2:
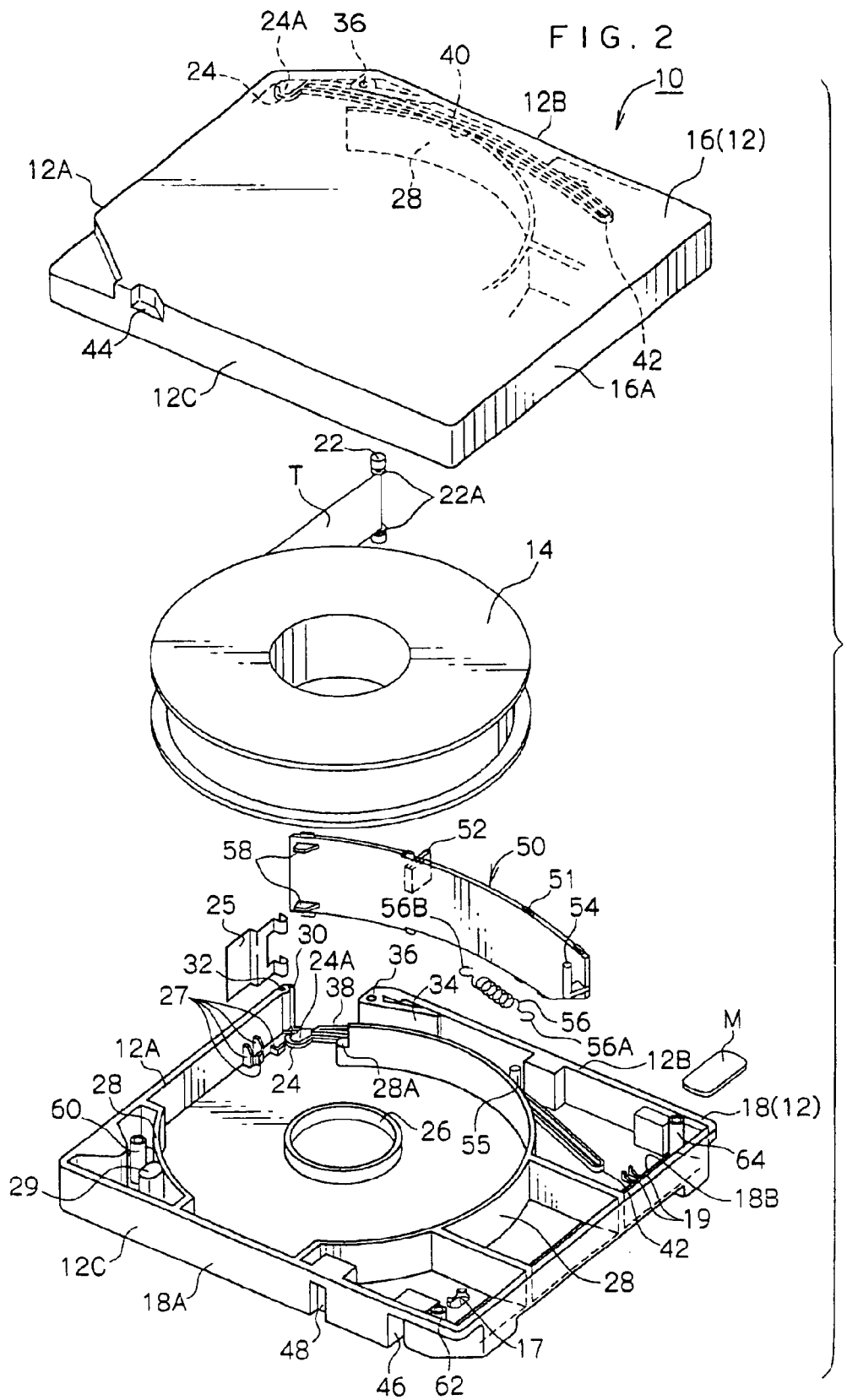
FIG. 2 is a schematic exploded perspective view of the recording tape cartridge.

As shown in FIGS. 1 and 2, the recording tape cartridge 10 includes a case 12, which is substantially rectangular in plan view and within which is rotatably housed a single reel 14. A magnetic tape T, which serves as a recording tape and is a medium for recording and playing back information, is wound around the reel 14. The case 12 includes an upper case 16 and a lower case 18. The upper case 16 includes a peripheral wall 16A, and the lower case 18 includes a peripheral wall 18A. A front right corner portion, which is one corner portion at the front side in the direction in which the recording tape cartridge 10 is loaded into the drive device, of each of the upper case 16 and the lower case 18 is cut out. The peripheral wall 16A and the peripheral wall 18A are brought into contact with each other, whereby the upper case 16 is joined to the lower case 18 to form the case 12. A housing space for the reel 14, around which the magnetic tape T is wound, is disposed inside the case 12.

A corner portion, from which the peripheral wall 16A of the upper case 16 and the peripheral wall 18A of the lower case 18 have been cut away, serves as an opening 20 through which the magnetic tape T is pulled out. A leader pin 22, which is caught (engaged) and pulled out by a pull-out mechanism of the drive device, is connected to a free end of the magnetic tape T that is pulled out through the opening 20. An annular groove 22A is formed in both end portions of the leader pin 22, which end portions of the leader pin 22 project from width-direction end portions of the magnetic tape T. The annular grooves 22A are caught by hooks or the like of the pull-out mechanism. Thus, when the magnetic tape T is pulled out, the hooks do not contact and damage the magnetic tape T.

Figure 3:
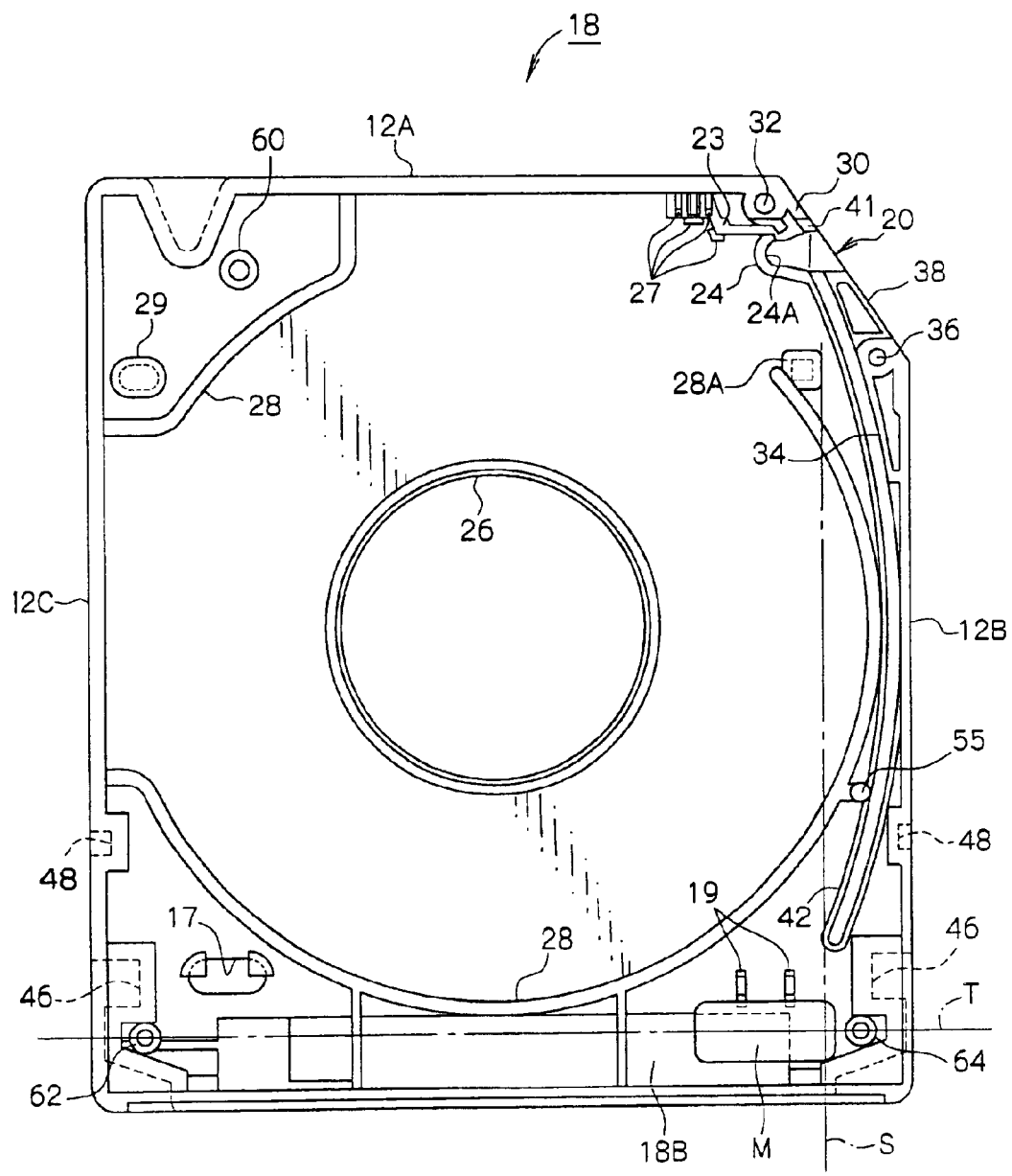
FIG. 3 is a schematic plan view of a lower case.
Figure 4:
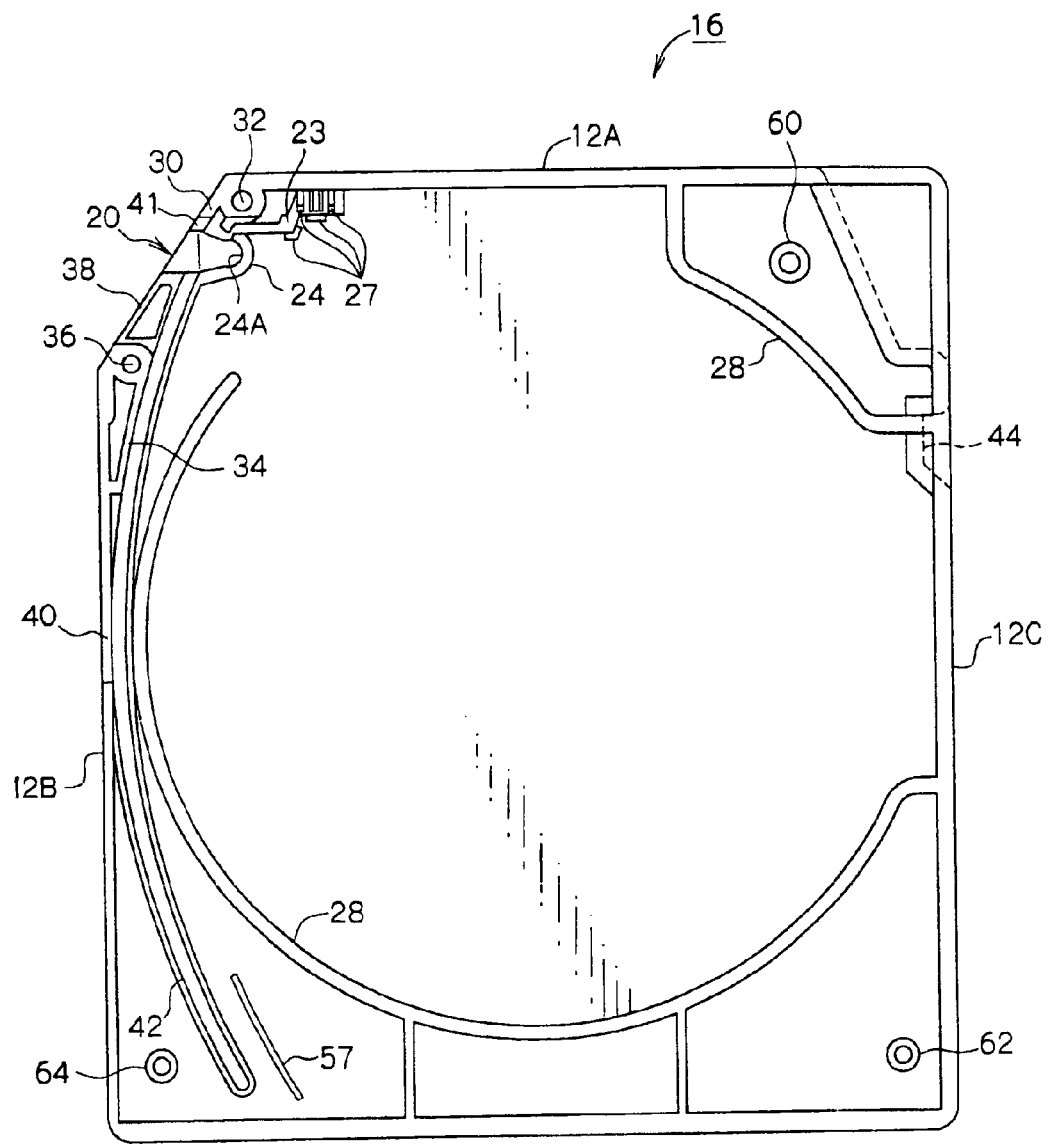
FIG. 4 is a schematic plan view of an upper case.

A pair of upper and lower pin retainers 24 that position and retain the leader pin 22 inside the case 12 is disposed inside the opening 20 of the case 12. As shown in FIGS. 3 and 4, the pin retainers 24 have a substantially semi-cylindrical shape, and both end portions of the leader pin 22 are retained in recess portions 24A in the pin retainers 24 in a state in which the leader pin 22 is vertically disposed therein. The sides of the pin retainers 24 at which the magnetic tape T is pulled out are open and serve as a gateway through which the leader pin 22 enters and exits.

A plate spring 25 is fixed and disposed in a spring retainer 27 near the pin retainers 24. The spring retainer 27 is disposed at an inner surface of a front wall 12A (a portion of the peripheral walls 16A and 18A at which outer surfaces thereof face the direction of arrow A). A base portion of the plate spring 25 is inserted into the spring retainer 27. Forked end portions of the plate spring 25 engage with the upper and lower ends of the leader pin 22 and retain the leader pin 22 in the pin retainers 24. When the leader pin 22 enters and exits the pin retainers 24, the end portions of the plate spring 25 appropriately elastically deform to allow movement of the leader pin 22.

Moreover, a gear opening 26, for exposing an unillustrated reel gear of the reel 14 to the outside, is disposed in a center portion of the lower case 18. The reel gear meshes with a drive gear of the drive device, whereby the reel 14 is rotatably driven inside the case 12. The reel 14 is retained by play regulation walls 28 so that the reel 14 does not chatter. The play regulation walls 28 are partially disposed at respective inner surfaces of the upper case 16 and the lower case 18, and serve as an inner wall on a circular locus that is concentric with the gear opening 26.

A pocket portion 28A, within which a position-regulating hole is formed, is connectedly disposed at an end portion of the play regulation wall 28 near the opening 20. A pocket portion 29, in which a position-regulating hole 29A—which is a long hole—is formed, is disposed, apart from the play regulation wall 28, at an inner side of the left front corner portion of the case 12. The pocket portions 28A and 29 are disposed on a straight line along the direction of arrow B, and peripheries (portions that are the same as or slightly wider than the thickness of the pocket portions 28A and 29) of the position-regulating holes in the lower surface side serve as reference surfaces for positioning with respect to the drive device. With the exception of the end portion at which the pocket portion 28A is disposed, the end portion of each play regulation wall 28 is continuous with the peripheral wall 16A or the peripheral wall 18A of the case 12, whereby the inside of the case 12 is partitioned between the outer side of the play regulation walls 28 and the space in which the reel 14 is disposed.

Also, a pair of upper and lower screw bosses 60 is disposed at predetermined positions between the play regulation wall 28 and the front wall 12A, near which the pocket portion 29 in the lower case 18 is disposed. Pairs of upper and lower screw bosses 62 and 64 are also disposed at predetermined positions in both corner portions between a left wall 12C and a right wall 12B and both end portions of a rear portion inner wall 18B in the lower case 18. The pairs of upper and lower screw bosses 60, 62 and 64 penetrate the lower case 18 but do not penetrate the upper case 16.

A pair of short upper and lower slanted wall portions 30 that regulate a front edge portion of the opening 20 is disposed at a right end portion of the front wall 12A of the case 12. The slanted wall portions 30 are formed so as to bend along an open surface of the opening 20 and serve as dust prevention walls, so that a gap through which dust or the like can enter is not generated when a leading edge of a door 50, which will be described later and has a substantially arced shape when seen in plan view, enters therein when closing the opening 20. Additionally, a pair of upper and lower screw bosses 32 is connectedly disposed at an inner side of the front wall 12A near the slanted wall portions 30.

A pair of upper and lower slanted wall portions 34, which are of a shape in plan view substantially along an outer peripheral surface of the door 50 described later, is disposed at an inner side of a front end portion of the right wall 12B (a portion of the peripheral walls 16A and 18A at which outer surfaces thereof face the direction of arrow B) of the case 12. Front end surfaces of the slanted wall portions 34 define a rear edge of the opening 20, and a pair of upper and lower screw bosses 36 is disposed at front end portions thereof.

A slit 40 of a predetermined length that serves as a window portion through which the outside of the case 12 communicates with the inside of the case 12 is disposed in the right wall 12B of the case 12, and is for exposing an operational protrusion 52 of the door 50 described later. The slit 40 is formed by cutting out a front side lower portion of the peripheral wall 16A of the upper case 16 that configures the right wall 12B, and the slit 40 also opens to the opening 20. It is preferable for the slit 40 to be formed so that a portion of the peripheral wall 16A remains at the upper side because rigidity of the case 12 can be maintained. It is particularly preferable for the wall of the upper side defining the slit 40 to be integrally and connectedly disposed from the slanted wall portions 34.

A recess portion 48 is formed at a rearward side of the lower case 18. The recess portion 48 is one in which a portion excluding an upper end of the peripheral wall 18A is recessed inward of the case 12, in a substantial "U" shape when seen in cross section, and upward from a lower surface of the case 12 (a bottom panel has been cut out). Another recess portion 48 is also formed in the left wall of the case 12. The recess portions 48 serve as engaging portions with which a pulling mechanism of the drive device engages, and bottom surfaces (downward-facing surfaces) of the recess portions 48 serve as reference surfaces for positioning the recording tape cartridge 10 inside the drive device.

Recess portions 46 are formed at rearward sides of the recess portions 48. Each recess portion 46 is one in which a portion excluding the upper end of the peripheral wall 18A is recessed inward of the case 12, in a substantial "U" shape when seen in cross section, and upward from the lower surface of the case 12 (a bottom panel has been cut out). The recess portions 46 serve as engaging portions with which a gripping mechanism of a library device engages. By disposing these recess portions 46 and 48, torsion strength of the case 12 (lower case 18) is improved. Also, a recess portion 44, which is substantially trapezoidal when seen in plan view, is formed in an upper surface portion of the left wall 12C of the upper case 16. The recess portion 44 serves as an engaging portion with which a retention member (not illustrated) for canceling torque accompanying movement of the door 50 in an opening direction when the opening 20 is opened engages.

Guide wall portions 42 of a predetermined height (e.g., about 1.0 mm to about 1.5 mm), which support protruding portions 51 of the door 50 so as to sandwich the protruding portions 51 from both an inner surface side and an outer surface side, are disposed in the upper case 16 and the lower case 18, from a vicinity of the opening 20 to a vicinity of a site at which the play regulation walls 30 come nearest to the right wall 12B (referred to below as front halves) and from a vicinity of a rear end of the slit 40 to a vicinity of the rear wall (referred to below as rear halves).

The lengths of the guide wall portions 42 differ between the upper case 16 and the lower case 18, and the guide wall portions 42 are formed so that the rear half of the guide wall portion 42 of the upper case 16 is longer than the rear half of the guide wall portion 42 of the lower case 18. The reason for this is because a memory board M described later is slantingly disposed at a predetermined angle at the right wall 12B side of a rear portion inner wall 18B of the lower case 18. Rear end portions of the guide wall portions 42 of the rear halves are closed off in substantially arced shapes when seen in plan view and respectively regulate the rearmost upper and lower protruding portions 51 so that the door 50 cannot move any further rearward than the rear end portions of the guide wall portions 42.

Front end portions of the front halves of the guide wall portions 42 are opened and extendedly disposed as far as positions (in the drawings, these positions are rearward of the pin retainers 24 and extending as far as to about half the opening width of the opening 20) at which they do not obstruct the entry and exit of the leader pin 22 when the leader pin 22 enters and exits. Guide wall portions 41, whose rear end portions are opened, are also vertically disposed near the slanted wall portions 30 so that they are positioned on an extension line of the guide wall portions 42. The guide wall portions 41 do not extend rearward of front ends of the pin retainers 24 so that the rear end portions of the guide wall portions 41 do not obstruct the entry and exit of the leader pin 22, and the door 50 closes the opening 20 in a state in which the leading end of the door 50 has entered the guide wall portions 41.

The guide wall portions 41 and the front halves of the guide wall portions 42 are formed so that they are slightly lower than the rear halves of the guide wall portions 42. That is, the height of the guide wall portions 41 and the front halves of the guide wall portions 42 is, for example, about 1 mm, and the height of the rear halves of the guide wall portions 42 is, for example, about 1.5 mm. The reason for this is to ensure a space into which the pull-out mechanism of the drive device that chucks and pulls out the leader pin 22 can enter. Therefore, as described later, the plate width (height) of the door 50 is larger (higher) in the front half portion thereof (at least the portion that closes the opening 20) by the amount that the guide wall portions 41 and the front halves of the guide wall portions 42 become lower.

Ribs 38, which are integrated with outer sides of the guide wall portions 42 exposed through the opening 20 to form a substantially trapezoidal shape when seen in plan view, are vertically disposed at the inner surface of the upper case 16 and the inner surface of the lower case 18 so that they have a height that is the same as that of the guide wall portions 42. The strength of the upper case 16 and the lower case 18 at the opening 20 portion is secured by these ribs 38. It should be noted that, although inner sides of the guide wall portions 42 are connectedly disposed so as to be integral with the pin retainers 24, it is preferable for the height of the pin retainers 24 to be substantially equal to, or higher than, the height of the integrally disposed guide wall portions 42.

The above-described upper case 16 and lower case 18 are fixed (joined) by unillustrated screws being screwed from an underside thereof into the screw bosses 32 and 36 positioned near the edge portions of the opening 20 and into the screw bosses 60, 62 and 64. Thus, corner portions at both ends of the opening 20, which are defined by each free end of the slanted wall portions 30 (front wall 12A) and the slanted wall portions 34 (right wall 12B) and are likely to strongly collide with the ground or the like when the case 12 is accidentally dropped, are firmly joined so that, even if the case 12 is dropped, they are not deformed, do not buckle, and do not become positionally offset by the weight of the overall recording tape cartridge 10.

The opening 20 is opened and closed off by the door 50, which serves as a shielding member. The plate width (height) of at least the portion of the door 50 that blocks off the opening 20 is substantially the same as the opened height of the opening 20, the rear side is slightly smaller (lower) than that, and the plate length of the door 50 is sufficiently larger than the opened width of the opening 20. When seen in plan view, the door 50 is formed in a substantial arced shape that curves in a plate thickness direction so that the door 50 can move along a predetermined circumference.

The door 50 closes off the opening 20 in a state in which the front end portion of the door 50 has been inserted into the guide wall portions 41, opens up the opening 20 by sliding (rotating) substantially rearward along the predetermined circumference, and completely opens up the opening 20 when the outer peripheral surface near the front end of the door 50 reaches the vicinity of the screw bosses 36. The door 50 closes off the opening 20 by sliding (rotating) in the direction opposite to the direction in which it slides when opening up the opening 20.

The door 50 is curved in an arced shape corresponding to the predetermined circumference that is the locus of its movement. In the present embodiment, the rotational center of the door 50 is set to a position so that it is near the left end of the case 12 in the left-right direction and near the rear end of the slit 40 in the front-rear direction. Thus, the locus of movement of the door 50 is nearest the right wall 12B of the case 12 in the vicinity of the rear end of the slit 40. It should be noted that the radius and rotational center of the door 50 may be appropriately determined in accordance with the angle of the open surface of the opening 20 determined by the demand from the library device and the position of the front-rear edge portions (slanted wall portions 30 and screw bosses 36) of the opening 20 determined by the demand from the drive device.

The curved longitudinal dimension of the door 50 is determined so that the rear end portion of the door 50 is positioned within the right rear corner portion (in the vicinity of the recess portions 46) further rearward from the recess portions 48 of the case 12 even in a state in which the opening 20 is opened up. The rear lower portion of the door 50 is diagonally cut out in order to avoid the memory board M described later slantingly disposed at the predetermined angle at the rear portion inner wall 18A of the lower case 18. It should be noted that it is preferable for the inner surface and/or the outer surface of the front end portion of the door 50 to be formed as a tapered surface so that it can be smoothly inserted between the guide wall portions 41.

The protruding portions 51 are disposed at the upper surface and the lower surface of the door 50. The protruding portions 51 respectively abut against the inner surface of the upper case 16 and the inner surface of the lower case 18 between the guide wall portions 42 and against guide surfaces (mutually opposite inner surfaces) of the guide wall portions 42, and guide the door 50 in the directions in which the door 50 opens and closes off the opening 20. The protruding portions 51 are formed in substantially oval shapes, when seen in plan view, which are long along the longitudinal direction of the door 50. Four protruding portions 51 each are disposed on the upper surface and the lower surface of the door 50. The protruding portions 51 are vertically symmetrical with the exception of the rearmost protruding portions 51, and are of a height (e.g., a front side is about 0.5 mm and a rear side is about 1.5 mm from a boundary portion at which the plate width of the door 50 differs) that is substantially equal to the height of the guide wall portions 42. It should be noted that the reason the rearmost protruding portions 51 are not vertically symmetrical is because the rear lower portion of the door 50 is diagonally cut out.

When the protruding portions 51 are disposed, sliding resistance (friction) between the inner surface of the lower case 18 and the inner surface of the upper case 16 between the guide wall portions 42 and the guide wall portions 41 and the guide surfaces of the guide wall portions 42 and the guide wall portions 41 can be reduced, and it becomes possible for the door 50 to smoothly slide with little resistance. Moreover, when the protruding portions 51 are formed in substantially oval shapes when seen in plan view, impact resistance is better than a case where the protruding portions are formed in, for example, substantially circular shapes when seen in plan view. Therefore, there is no worry that the protruding portions 51 will break even if a force acts on the door 50 in directions other than the opening/closing directions due to impact resulting from the case 12 being dropped.

The operational protrusion 52, which serves as an operational portion, is disposed along a circumferential direction of the door 50 at an outer peripheral surface of the door 50 slightly in front of the longitudinal-direction center portion of the door 50 (near a boundary portion at which the plate width of the door 50 differs). The operational protrusion 52 is exposed to the outer side of the case 12 through the slit 40, is positioned slightly away from the rear ends of the screw bosses 36 in a state in which the opening 20 is closed, and is operable from a portion opening towards the front of the slit 40. In a state in which the opening 20 is opened, the operational protrusion 52 is positioned slightly away from the rear edge of the slit 40, and the rearmost protruding portions 51 abut against the rear end portions of the guide wall portions 42 at this time.

Although the inside of the case 12 communicates with the outside of the case 12 due to the slit 40 for exposing the operational protrusion 52, the slit 40 is ordinarily substantially closed off by the screw bosses 36 and the door 50 extending across the substantially entire height inside the case 12, and dust is prevented from adhering to the magnetic tape T wound around the reel 14 due to the play regulation walls 28 serving as the inner wall.

Stoppers 58, which abut against a side surface of the upper end portion and a side surface of the lower end portion of the leader pin 22 when the opening 20 is closed off, are disposed so as to project from the inner surface of the front end portion of the door 50, and can further prevent the leader pin 22 from falling out of the pin retainers 24 due to impact when the case 12 is dropped. Additionally, because the door 50 has a length that spans the right rear corner portion of the case 12 in a state in which the opening 20 is closed off, the coil spring 56, which serves as an urging member that urges the door 50 in the direction that the opening 20 is closed off, is disposed to effectively use the space between the play regulation walls 28 in the right rear corner portion and the right wall 12B (peripheral walls 16A and 18A).

That is, a spring retainer 54, which is substantially "L" shaped when seen in rear view, is integrally disposed at the inner peripheral surface near the rear end of the door 50, and a cylindrical spring catch portion 55 is disposed facing upward at the inner surface of the lower case 18 near the recess portion 48. Ring-shaped attachment portions 56A and 56B are respectively formed at both ends of a coil spring 56. The attachment portion 56B is attached by the catch portion 55 being inserted therethrough from below. The attachment portion 56A is attached by the spring retainer 54 being inserted therethrough from below. Therefore, the coil spring 56 can be simply attached inside the space.

A rib 57, against which an upper end of the spring retainer 54 slides when the door 50 is opened and closed, is vertically disposed at the upper case 16 in a substantially arced shape when seen in plan view. The rib 57 is disposed with a length and at a position such that the upper end of the spring retainer 54 can slide against the rib 57 when at least the door 50 begins moving (opening), and suitably guides the spring retainer 54 moving counter to the urging force of the coil spring 56, whereby the door 50 is more stably opened (so that the door 50 is not shaken by the urging force of the coil spring 56 when opening).

By disposing the rib 57, the attachment portion 56A of the coil spring 56 attached as described above does not come off of the spring retainer 54, even if a shock resulting from the case 12 being dropped or the like is applied to the case 12 and the spring retainer 54 rises. It should be noted that, because the front end of the spring catch portion 55 is also inserted between the guide wall portion 42 and the play regulation wall 28 of the upper case, the attachment portion 56B can similarly be prevented from coming off of the spring catch portion 55.

The memory board M is also disposed inside the recording tape cartridge 10 (case 12) of this configuration. The memory board M is formed as a card in which is stored, for each recording tape cartridge 10, various information such as the recording capacity and the recording format of that cartridge. An IC chip and an antenna are incorporated in the memory board M so that it can be non-contactingly read. The memory board M is disposed, for example, at the right rear portion of the lower case 18.

That is, as shown in FIG. 3, the memory board M is supported, near the screw boss 64 of the right rear corner portion side, by the rear portion inner wall 18B formed at a slanting surface of a predetermined angle and support protrusions 19 that project forward, is disposed a predetermined angle—i.e., at an angle of inclination of substantially 45° so that detection by the drive device, which reads the memory board M from the undersurface side, and the library device, which reads the memory board M from the rear wall side, is possible—and part of the memory board M is positioned on (i.e., overlaps) a virtual straight line T that joins the screw boss 62 and the screw boss 64 when seen in plan view. Preferably, a center of the memory board M is disposed on the virtual straight line T.

When the memory board M is disposed at this position, positional displacement resulting from impact when the case 12 is dropped or the like can be deterred, and positional precision of the memory board M inside the case 12 can be improved. That is, because the position at which the memory board M is disposed inside the case 12 is restricted, the position of the memory board M can be more clearly grasped from the outer side of the case 12. Therefore, the precision of the distance between the memory board M and the reading device of the library device and the reading/writing device of the drive device accessing the memory board M can be improved, and it becomes possible for the entire antenna of the memory board M to receive electromagnetic waves transmitted from the reading device and the reading/writing device, whereby reading precision and writing precision can be improved.

As shown in FIG. 3, the screw boss 64, near which the memory board M is disposed, is disposed near a virtual straight line S that is parallel to the direction in which the recording tape cartridge 10 is loaded into the drive device and passes through (or along) the reference surface of the pocket portion 28A, which is one positioning member with respect to the drive device. The virtual straight line S is a site at which positioning is precisely effected with respect to the drive device. The memory board M is disposed so that a part thereof is positioned near the screw boss 64 disposed in this vicinity and preferably overlaps the virtual straight line S, whereby the positional precision of the memory board M with respect to the drive device (with respect to the reading/writing device) can be further improved.

Figure 5:
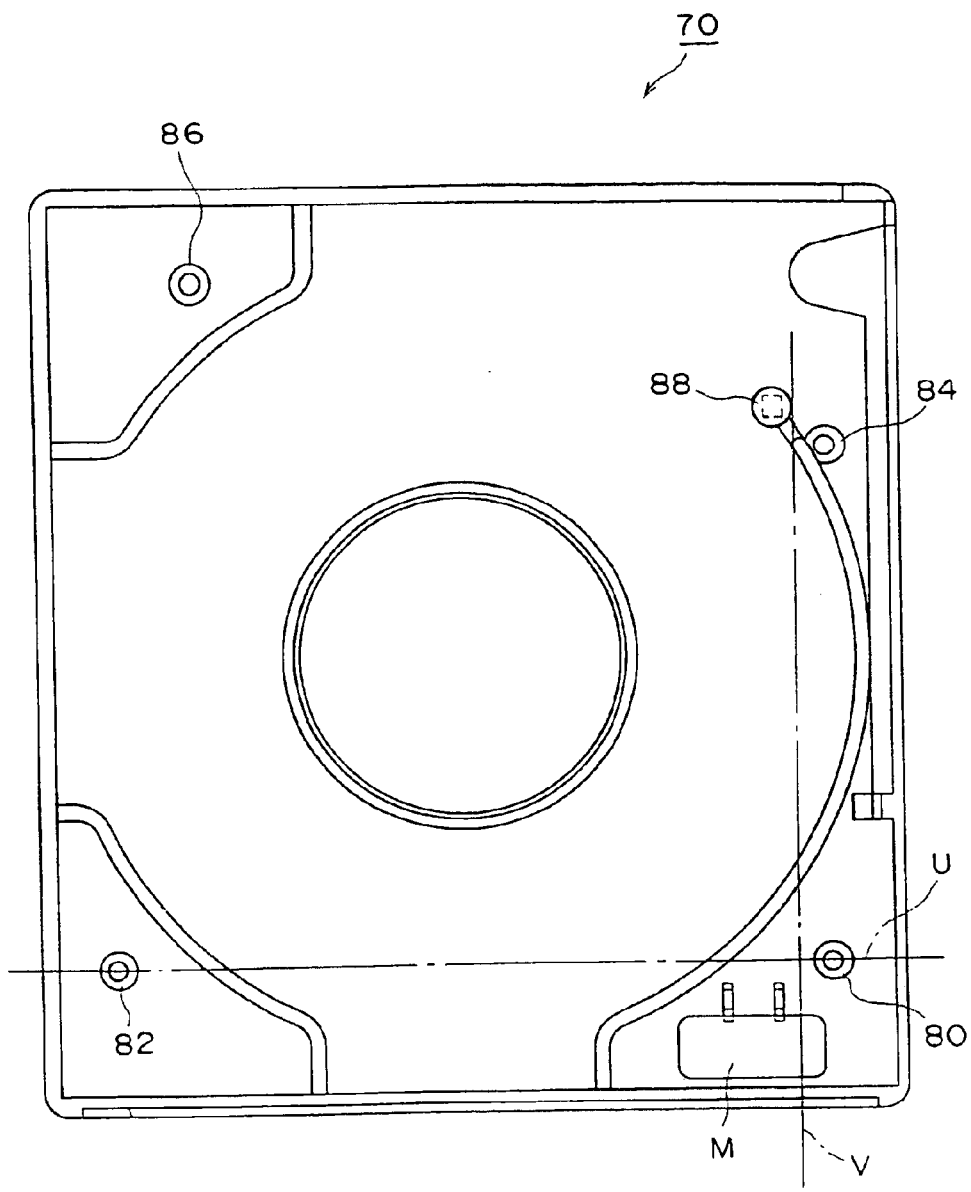
FIG. 5 is a schematic plan view of a lower case in a conventional magnetic tape cartridge.
Figure 6:
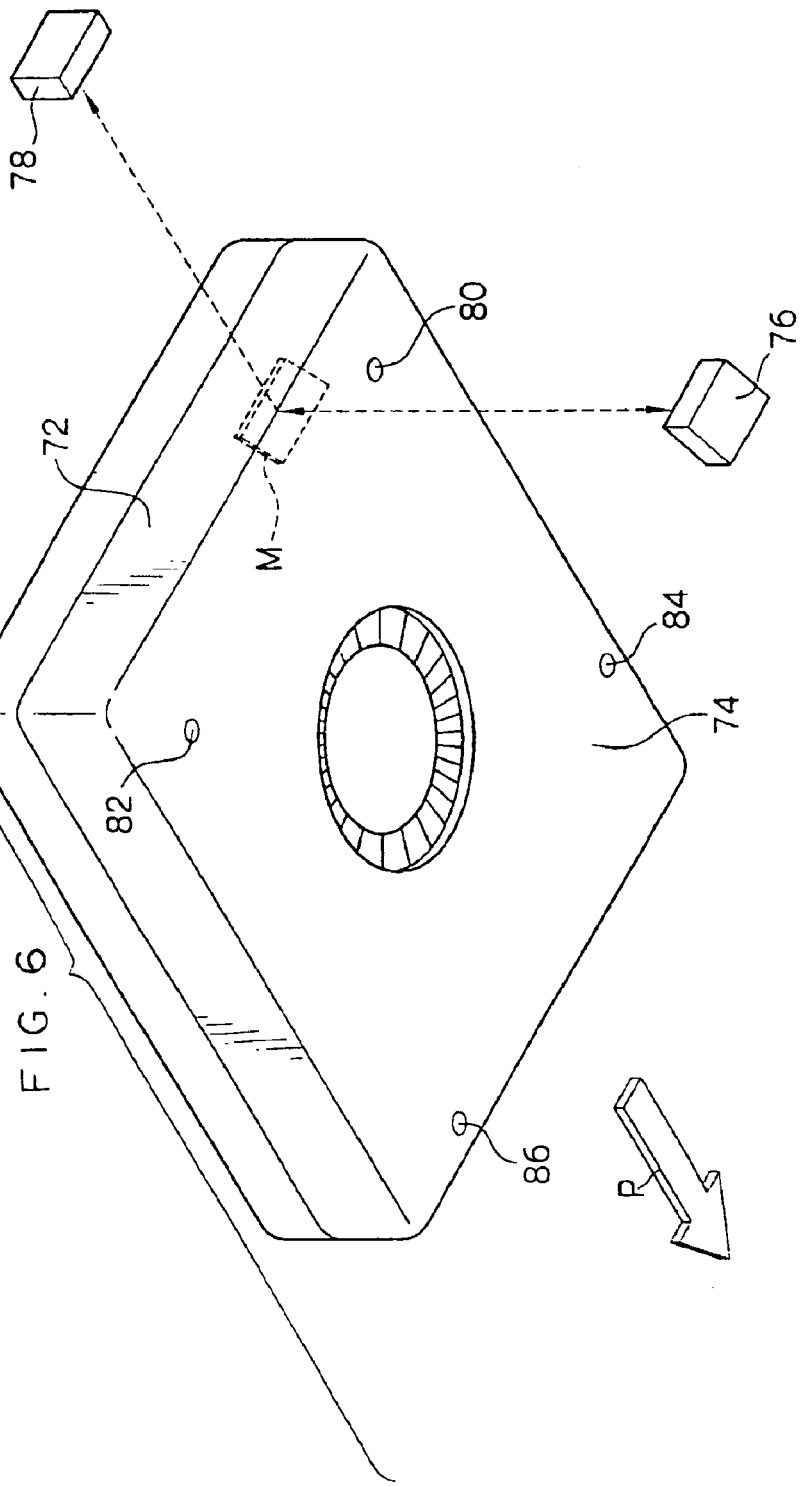
FIG. 6 is a schematic perspective view of the conventional magnetic tape cartridge.

It should be noted that, as shown in FIG. 5, in the conventional recording tape cartridge 70, the memory board M does not overlap a virtual straight line U joining a screw boss 80 and a screw boss 82 but does overlap a virtual straight line V passing along a reference surface 88. Therefore, relative positioning between the recording tape cartridge 70 and the reading/writing device disposed at the drive device can be relatively easily set even with this configuration alone. In addition, a write-protect portion (not shown), in which is set whether or not it is possible to record to the recording tape cartridge 10, is also disposed at a left rear portion of the lower case 18, and an open hole 17, through which a recognition portion (not shown) of the write-protect portion projects, penetrates the left rear portion of the lower case 18.

Next, the operation of the present embodiment will be described. In the recording tape cartridge 10 of the above-described configuration, the opening 20 is closed off by the door 50 when the recording tape cartridge 10 is not in use (during storage or transport). Specifically, the door 50 is always urged in the closing direction of the opening 20 by the urging force of the coil spring 56 and closes the opening 20 in a state where the leading end portion (front end portion) of the door 50 is inserted into the guide wall portions 41 near the slanted wall portions 30.

The recording tape cartridges 10 are housed in the library device in this state. The reading device disposed at the robotic hand accesses the memory boards M from the rear surface (rear wall) side of the recording tape cartridges 10, reads the various information stored therein, such as the recording capacity, and conveys this information to a control device. Thus, the optimum drive device for each recording tape cartridge 10 (the drive device that can record information on and play back information from the recording tape cartridge 10) is identified in advance by the control device.

When the magnetic tape T is to be used, the recording tape cartridge 10 is loaded into the drive device along the direction of arrow A. The drive device is chosen as a result of reading the information stored in the memory board M, and the recording tape cartridge 10 is smoothly and effectively loaded into the drive device by the robotic hand of the library device. An opening/closing member (not shown) configuring an opening/closing mechanism of the drive device enters the slit 40, which opens frontward, in accompaniment with the loading, and engages with the operational protrusion 52 of the door 50.

In this state, when the recording tape cartridge 10 (case 12) is further pushed in, the opening/closing member moves the operational protrusion 52 (relatively moves the operational protrusion 52 rearward with respect to the case 12 loaded in the direction of arrow A) counter to the urging force of the coil spring 56 due to the pushing force. Thus, the door 50, on which the operational protrusion 52 is disposed, rotates in a clockwise direction (when seen in plan view) along the direction in which it is curved, as the protruding portions 51 are guided by the guide wall portions 42.

That is, the door 50 moves substantially rearward around the outer side of the reel 14 and the pin retainers 24, without sticking out from the locus of movement along the curved shape thereof, to open the opening 20. When the case 12 (recording tape cartridge 10) is loaded to a predetermined depth in the drive device, the opening 20 is completely opened, the case 12 is positioned, the reading/writing device disposed at the drive device accesses the memory board M form the undersurface side of the recording tape cartridge 10 and reads the various information stored therein, and writes separate information therein as necessary. When the recording tape cartridge 10 is positioned inside the drive device in a state where the opening 20 has been opened, further rotation (substantially rearward movement) of the door 50 is regulated, the pull-out mechanism of the drive device enters the case 12 through the opened opening 20 and pulls out the leader pin 22 positioned at retained at the pin retainers 24, and accommodates the leader pin 22 at an unillustrated take-up reel. The take-up reel and the reel 14 are synchronously rotatingly driven, whereby the magnetic tape T is successively pulled out from the case 12 as it is taken up at the take-up reel, and information is recorded and played back by a recording and playback head disposed along a predetermined tape path.

When the magnetic tape T is to be rewound and the recording tape cartridge 10 is to be ejected from the drive device, the positioned state of the recording tape cartridge 10 is released and the recording tape cartridge 10 is moved in the direction opposite to the direction of arrow A by the urging force of the coil spring 56 or an unillustrated ejecting mechanism. The door 50 is rotated, by the urging force of the coil spring 56, in the direction in which the opening 20 is closed off as the projections 51 are guided by the guide wall portions 42. The leading end portion of the door 50 is inserted into the guide wall portions 41, whereby the opening 20 is completely closed off and restored to its initial state.

Here, the disposed position of the memory board M is regulated inside the case 12 so that at least a part thereof is near the screw boss 64 and positioned on, i.e., overlaps (so that, with respect to the memory board M in the drawings, the center of the memory board M is on the virtual straight line T) the virtual straight line T joining the screw boss 62 and the screw boss 64 when seen in plan view. Thus, positional displacement resulting from impact when the case 12 is dropped or the like can be deterred, and positional precision of the memory board M inside the case 12 can be improved. Therefore, the precision of the distance between the memory board M and the reading device and the reading/writing device can be improved, and reading precision and writing precision can be improved.

Moreover, the screw boss 64, near which the memory board M is disposed, is disposed near the virtual straight line S that is parallel to the direction in which the recording tape cartridge 10 is loaded into the drive device (the direction of arrow A) and passes through (or along) the reference surface of the pocket portion 28A that serves as a reference for positioning the recording tape cartridge 10 with respect to the drive device. Thus, positional precision of the memory board M with respect to the drive device (with respect to the reading/writing device) can be further improved. Therefore, this can ensure that reading errors and writing errors do not occur.

As described above, according to the invention, because the disposed position of the memory inside the case is restricted, the precision of the distance between the memory and the reading device and the writing device that access the memory can be improved, and reading precision and writing precision can be improved.

What is claimed is:

1. A cartridge which is loaded into a drive device and used for recording information on or reading information from a recording medium housed therein, the cartridge comprising:
   a case that includes an upper case and a lower case, with the upper case and the lower case being joined to house the recording medium inside the case, the upper case and the lower case respectively including, at different positions thereinside, at least two joint surfaces that are put together and fixed in order to join the upper case and the lower case; and
   a memory that is disposed inside the case and allows predetermined information to be stored in or read from the memory from the outside in a non-contact mode,
   wherein the memory is positioned so that at least part of the memory overlaps a virtual straight line joining the at least two joint surfaces;
   wherein through holes are formed in the joint surfaces of at least one of the upper case and the lower case, such that the virtual straight line joins the through holes, and
   the cartridge further includes at least two fixing members that are inserted into the through holes in order to fix the joint surfaces of the upper case and the lower case.

2. The cartridge of claim 1, further comprising a reference surface that provides a reference position, when the cartridge is loaded from a predetermined loading direction into the drive device and placed with the surface being placed thereinside, wherein the memory is positioned near a virtual straight line that passes through the reference surface and is parallel to the predetermined loading direction.

3. The cartridge of claim 1, wherein the fixing members include screws having threaded portions.

4. The cartridge of claim 1, wherein the upper case and the lower case respectively include at least two boss portions, with the joint surfaces being formed at the boss portions.

5. The cartridge of claim 1, wherein the cartridge is substantially rectangular and the at least two joint surfaces are positioned near both corner portions at a rearward side of the cartridge in a direction from which the cartridge is loaded into the drive device.

6. The cartridge of claim 1, wherein the memory is disposed at a predetermined angle of inclination inside the case with respect to a direction from which the cartridge is loaded into the drive device.

7. The cartridge of claim 1, wherein the predetermined information includes information in regard to recording capacity.

8. The cartridge of claim 1, wherein the recording medium includes recording tape, is disposed with a reel, and the recording tape is wound around the reel.

9. The cartridge of claim 1, wherein the lower case includes a rear portion inner wall which is formed at a slanting surface having a predetermined angle.

10. The cartridge of claim 9, further comprising a support protrusion which is disposed on the rear portion inner wall and projects forward, wherein the memory board is supported by the support protrusion.

11. A recording tape cartridge, which is loaded into a drive device from a predetermined direction for use, the recording tape cartridge comprising:
   a case including an upper case and a lower case that are mutually joined, the case having a substantially rectangular shape and being for rotatably housing therein a single reel wound with a recording tape;
   bosses provided inside the case in order to join the upper case and the lower case, the bosses being respectively positioned near both rearward corner portions in the predetermined direction; and
   a non-contact memory in which predetermined information can be stored and that is disposed inside the case,
   wherein the memory is positioned so that at least part of the memory overlaps, in plan view, a virtual straight line joining the bosses respectively positioned near both corner portions.

12. The recording tape cartridge of claim 11, wherein the bosses are integrally formed respectively with each of the upper case and the lower case, and the bosses include surfaces at which the bosses of the upper case and the bosses of the lower case are mutually joined.

13. The recording tape cartridge of claim 11, wherein the memory is disposed at a predetermined angle of inclination inside the case with respect to the predetermined direction.

14. The recording tape cartridge of claim 11, wherein the predetermined information includes information in regard to recording capacity.

15. The recording tape cartridge of claim 11, wherein the memory allows predetermined information to be stored in or read from the memory from the outside in a non-contact mode.

16. A cartridge which is loaded into a drive device and used for recording information on or reading information from a recording medium housed therein, the cartridge comprising:
   a case that includes an upper case and a lower case, with the upper case and the lower case being joined to house the recording medium inside the case, the upper case and the lower case each including, at different positions thereinside, at least two joint portions, the joint portions of the upper case and the joint portions of the lower case being mutually fixed to fix the upper case and the lower case; and
   a memory that is disposed inside the case and allows predetermined information to be stored in or read from the memory in a non-contact mode,
   wherein the memory is positioned so that at least part of the memory overlaps a virtual straight line joining the at least two joint portions;
   wherein through holes are formed in the joint portions of at least one of the upper case and the lower case, such that the virtual straight line joins the through holes, and
   the cartridge further includes at least two fixing members that are inserted into the through holes in order to fix the joint portions of the upper case and the lower case.

17. The cartridge of claim 16, further comprising a reference surface that provides a reference position, when the cartridge is loaded from a predetermined loading direction into the drive device and placed with the surface being placed thereinside, wherein the memory is positioned near a virtual straight line that passes through the reference surface and is parallel to the predetermined loading direction.

18. The cartridge of claim 16, wherein the cartridge is substantially rectangular, and the at least two joint portions are positioned near both corner portions at a rearward side of the cartridge in a direction from which the cartridge is loaded into the drive device.

* * * * *